Feb. 25, 1964 P. E. BESSIERE 3,122,100
SELF-REGULATING PUMPS IN PARTICULAR FOR THE INJECTION
OF FUEL INTO INTERNAL COMBUSTION ENGINES
Filed Feb. 20, 1962 9 Sheets-Sheet 1

Fig.1.

INVENTOR
PIERRE ETIENNE BESSIERE

BY
Bailey, Stephens, Huettig
ATTORNEYS

United States Patent Office 3,122,100
Patented Feb. 25, 1964

3,122,100
SELF-REGULATING PUMPS IN PARTICULAR FOR THE INJECTION OF FUEL INTO INTERNAL COMBUSTION ENGINES
Pierre Etienne Bessiere, Neuilly-sur-Seine, France, assignor to Societe Anonyme pour l'Exploitation des Procedes Chimiques et Physiques, Zug, Switzerland, a Swiss company
Filed Feb. 20, 1962, Ser. No. 174,446
Claims priority, application France Dec. 24, 1957
23 Claims. (Cl. 103—41)

The present invention relates to self-regulating reciprocating pumps and it is more especially, but not exclusively, concerned with pumps for the injection of fuel into internal combustion engines.

The object of my invention is to provide a pump of this kind which is better adapted to meet the requirements of practice than those known up to this time.

The pump according to the present invention includes a main piston having a reciprocating movement in a main cylinder communicating with a discharge conduit, the opening and closing of this discharge conduit being controlled by a shuttle piston acting as a slide valve movable in a housing having at least one cylindrical portion, said shuttle piston being driven in one direction by a liquid under pressure delivered into a variable volume chamber formed between the shuttle piston and its housing, this liquid under pressure being periodically fed to said chamber by an auxiliary reciprocating pump driven in synchronism with the main pump, this shuttle piston being urged in the other direction by resilient means against the action of a braking system constituted by a throttled passage formed in a portion of an outflow circuit through which flows a liquid delivered by the shuttle piston during the stroke thereof where it is returned by said resilient means.

Preferred embodiments of the present invention will be hereinafter described with reference to the accompanying drawings, given merely by way of example and in which.

Figure 1:
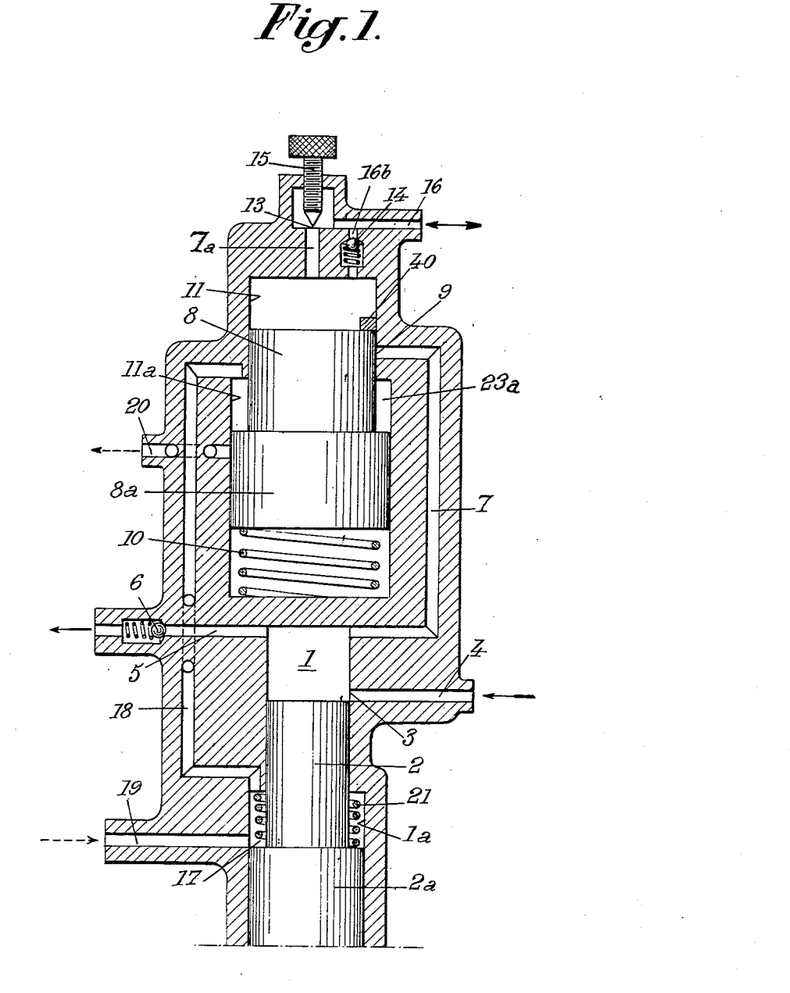
FIGS. 1 to 7 and 9 to 11 inclusive are diagrammatical sectional views of different embodiments of an injection pump made according to the present invention.
Figure 2:
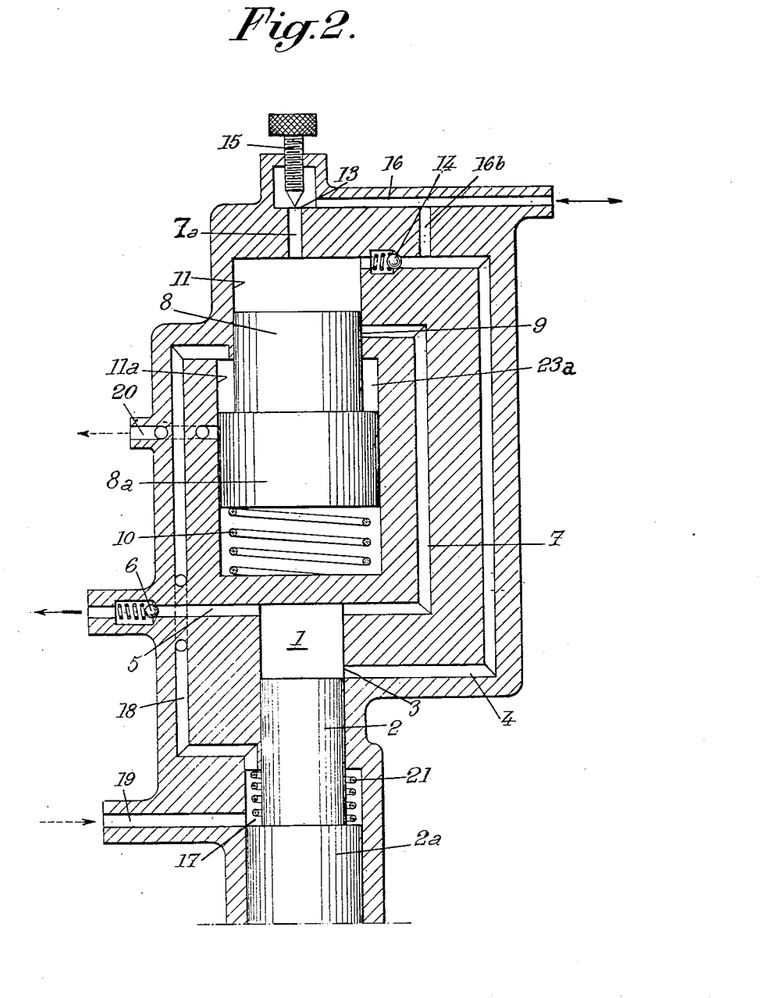

Referring to the pumps of FIGS. 1 and 2, each of these pumps includes a main cylinder 1 in which reciprocates a main piston 2 driven through any suitable means, such for instance as a cam. This piston controls the opening 3 of a fuel inlet conduit 4, this conduit being fed with fuel from a pump (not shown) which supplies said fuel under a low pressure. The delivery end of cylinder 1 communicates with a delivery conduit 5 leading to the injector or injectors of the engine fed by the pump, a check valve 6 being advantageously provided in said delivery conduit 5.

In order to obtain an automatic regulation of the amount of fuel flowing through conduit 5 on every cycle of the pump, as a function of the speed at which said pump is driven, I provide cylinder 1 with a discharge conduit 7 opening to the outside and controlled by a shuttle piston 8 which is positively driven in one direction (downward direction on FIGS. 1 and 2, the opening 9 of discharge conduit 7 being cleared by shuttle piston 8 near the end of said downward stroke of said shuttle piston) during the delivery stroke of the main piston (which is an upward stroke), said shuttle piston being moved in the other direction (return stroke), during the suction stroke of piston 2, by resilient return means and against the action of hydraulic braking means.

The return means are preferably constituted by a spring 10.

Braking of the return movement of shuttle piston 8 is ensured by providing the cylindrical housing 11 in which shuttle piston 8 is reciprocating with a fuel conduit 16 connected with a primary pump such for instance as that used for feeding fuel through conduit 4. Conduit 16 communicates with the inside of housing 11 through two conduit elements 7a and 16b. In the first of these conduits elements, 7a, which constitutes an outflow conduit element, there is provided a throttled passage 13 and in the second of these conduit elements, 16b, which constitutes a feed conduit element, there is provided a check valve 14 which permits fuel to flow only toward cylinder 11 through said last mentioned conduit element. Throttled passage 13 may be adjustable by means of a screw 15.

Shuttle piston 8 is moved in the downward direction by the pressure of a liquid fed from an auxiliary pump working in synchronism with the main pump 1—2.

The delivery of this auxiliary pump communicates with a variable volume chamber the expansion of which produces the downward movement of shuttle piston 8. In the embodiment shown by FIGS. 1 and 2, the shuttle piston includes two cylindrical portions in line with each other, to wit portion 8 and portion 8a, of a greater diameter than portion 8. The portion 8 of the shuttle piston fits in cylindrical housing 11 and the portion 8a of said shuttle piston fits slidable in a cylindrical housing 11a of a diameter greater than that of housing 11. The liquid supplied from the auxiliary pump is fed to the annular variable volume chamber 23a provided between shuttle piston portion 8 and the wall of cylindrical housing 11a.

The auxiliary pump is obtained by providing the main piston 2 with an extension 2a of larger diameter which is slidable with a fluidtight fit in a cylinder 1a, the annular space 17 thus formed between piston 2 and said cylinder 1a being connected through a conduit 18 with the annular variable volume chamber 23a. A feed conduit 19, opening into annular space 17, serves to feed liquid under pressure, for instance fuel, from the above mentioned primary pump. A discharge conduit 20, starting from cylindrical housing 11a, is located in such manner as to be closed by shuttle piston portion 8a as long as the opening 9 of conduit 7 is itself closed by the portion 8 of said shuttle piston, but to be opened when said opening 9 is cleared by the shuttle piston element 8.

The annular space 17 may be used to house a spring 21 which keeps the whole of pistons 2 and 2a applied against the driving cam.

In the modification of FIG. 1, conduits 4 and 16 are connected in parallel with the primary pump. In the modification of FIG. 2, conduit 4 is in communication with conduit 16 through element 16b.

The pump above described works in the following manner.

On the drawings, combined piston 2—2a is shown in its lower dead center position and shuttle piston 8—8a in its top position where it closes the opening 9 of discharge conduit 7.

During every delivery stroke of main piston 2—2a (upward stroke in the drawings), this main piston first closes port 3 and the opening of feed conduit 19. Piston 2 then delivers, through delivery conduit 5, the fuel contained in cylinder 1. Simultaneously, the portion 2a of said main piston delivers liquid from annular space 17 into the annular chamber 23a, which positively displaces shuttle piston 8—8a in the downward direction until discharge conduit 20 is opened, which then stops shuttle piston 8—8a. At this time, the opening 9 of discharge conduit 7 is cleared by the portion 8 of the shuttle piston, which stops injection. At the same time as shuttle piston 8—8a moves downwardly, cylindrical housing 11 is filled with liquid mainly through conduit 16b past check valve 14.

During the suction stroke of main piston 2—2a (downward stroke), shuttle 8—8a is pushed back in the upward direction by spring 10. As soon as opening 9 is closed, the shuttle piston is braked due to the fact that it must cause the fuel present in cylindrical housing 11 to flow through outflow conduit 7a, which comprises throttled passage 13. When piston 2—2a reaches its lower dead center position, cylinder 1 is filled with fuel through conduit 4 and the partial vacuum which exists in the spaces 23a, 17 and conduit 18 is filled with liquid flowing through conduit 19.

When the internal combustion engine fed with fuel from the injection pump above described runs at a speed lower than a given value, shuttle piston 8—8a is given sufficient time to reach its top position shown by the drawings before main piston 2—2a starts back upon its next delivery stroke, and consequently before said shuttle piston is compelled to move back in the downward direction by the fluid under pressure fed from chamber 17 into chamber 23a. The stroke of shuttle piston 8—8a then has a constant amplitude, the opening 9 of the discharge conduit 7 is cleared at a given point of the stroke of the main piston and the amount of fuel injected on every cycle is constant and maximum.

When the engine speed exceeds the above mentioned limit value, shuttle piston 8—8a moves through only a portion of its maximum upward stroke, this portion decreasing as the speed increases. It follows that the opening 9 of discharge conduit 7 is opened at an earlier relative time during the delivery stroke of piston 2 and the amount of fuel injected during every cycle decreases as the speed increases.

If the speed of the engine still increases, there comes a time where shuttle piston 8—8a is no longer capable of closing opening 9 and any injection ceases. This is a top speed that cannot be exceeded by the engine.

It is possible to modify the conditions in which the pump is regulated by adjusting screw 15 and/or means (not shown) for varying the load of spring 10. Screw 15 may be adjusted once and for all, as manually or controlled by a governor responsive to variations of the speed of the engine.

In the above described embodiment of the invention, the variable volume chamber 23a into which liquid is forced from the annular space 17 of the auxiliary pump 1a—2a is distinct from the variable volume chamber in cylinder 11 from which liquid is discharged by the shuttle piston so as to be compelled to pass through throttled passage 13.

In the other embodiments of the invention which will now be described with reference to FIGS. 3 to 13, the variable volume chamber 23, provided between shuttle piston 8 and cylindrical housing 11, communicates both with the delivery of the auxiliary pump 1a—2a (that is to say with the top of the cylindrical space 17) and with the outflow conduit 12 provided with a throttled passage 13. Generally, a check valve 24 is provided in the conduit 18 extending between annular space 17 and chamber 23 (FIGS. 3 and 5 to 11).

In order to enable shuttle piston 8 to connect the two discharge conduit elements 7 together, said piston is provided with an annular groove 25.

The dimension of throttled passage 13 may be made adjustable by means of a movable member.

Figure 7:
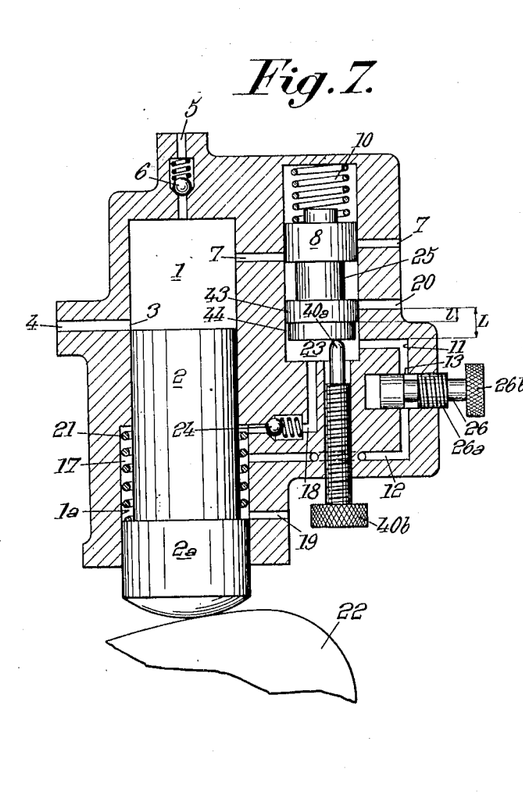
Figure 8:
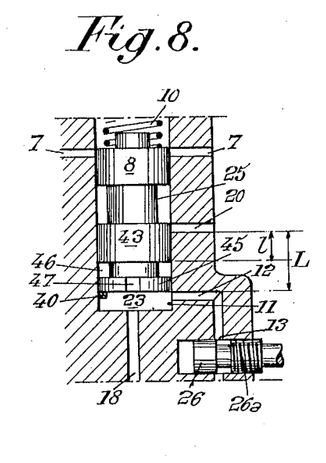
FIG. 8 shows a detail of a modification of the pump of FIG. 7.
Figure 9:
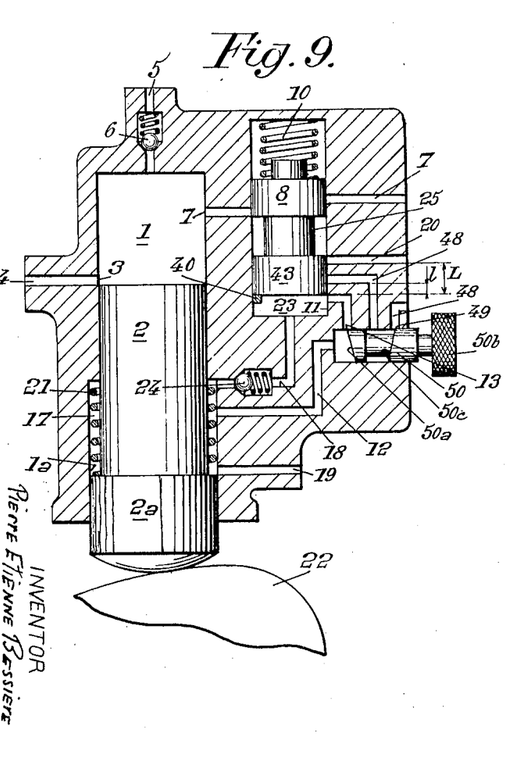
Figure 10:
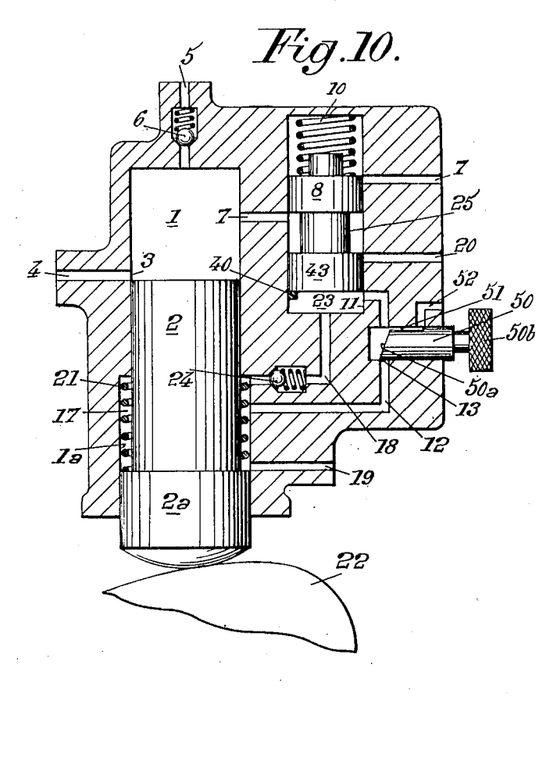
Figure 11:
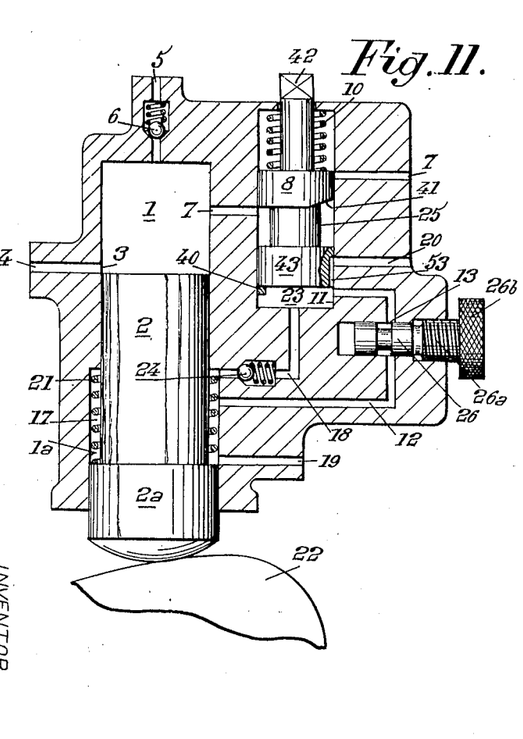

The control of this movable member may be a manual control, as shown by FIGS. 7, 8 and 11, where this member 26 can be moved longitudinally and rotatably and is provided with a threaded portion 26a and a control knob 26b, and as shown also on FIGS. 9 and 10 where said member, designated by reference numeral 50, is rotatable without being able to move longitudinally and is provided with an oblique edge 50a and a control knob 50b.

Figure 3:
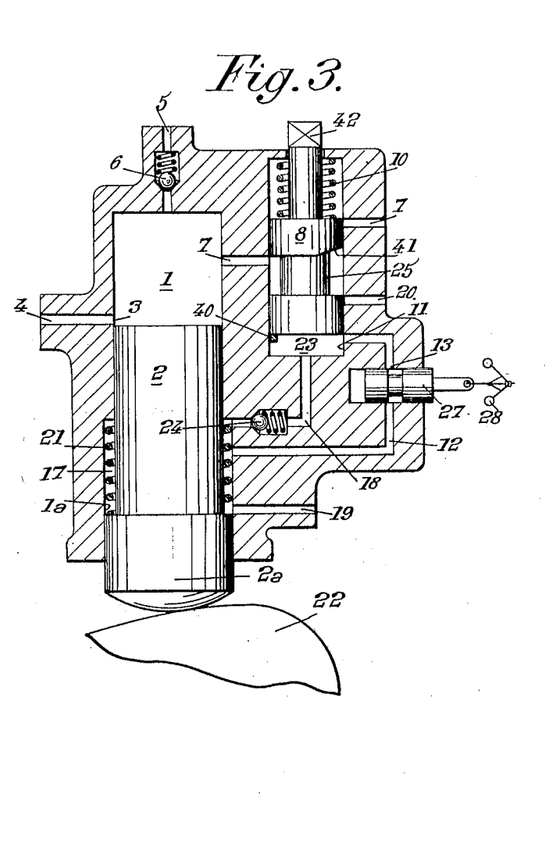
Figure 5:
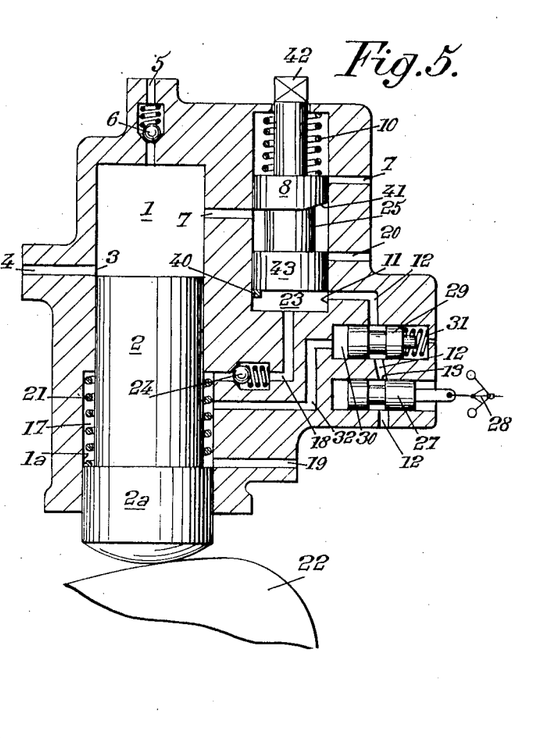
Figure 6:
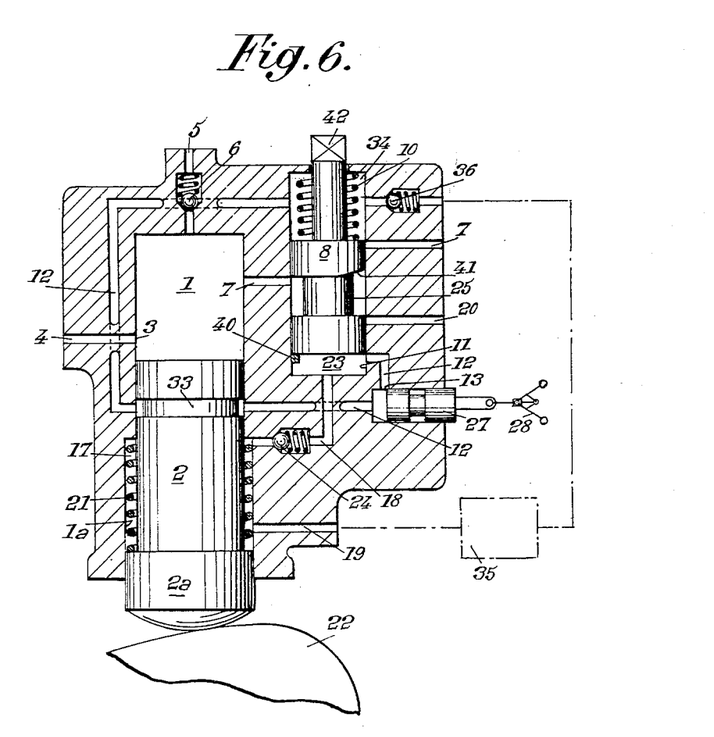

Said member may also be operated automatically as a function of the speed of the engine fed with fuel by the pump, as shown by FIGS. 3, 5 and 6, where this member, designated by reference numeral 27, is actuated by a governor 28, for instance of the centrifugal type, as shown, or preferably of the hydraulic type, capable of reducing the cross-section of throttled passage 13 as the speed increases.

Advantageously, the outflow circuit 12 containing throttled passage 13 is arranged in such manner that liquid is prevented from flowing through said throttled passage during at least a portion of every delivery stroke of the auxiliary pump so that, during this time, no liquid forced by the auxiliary pump can escape to the outside through throttled passage 13.

In order to obtain this result, in FIGS. 3 and 7 to 11 inclusive, conduit 12 leads back to annular space 17 so that the same pressure exists in said conduit 12 on both sides of throttled passage 13, respectively, during the delivery stroke of the auxiliary pump, and no circulation of fluid takes place through conduit 12.

Figure 4:
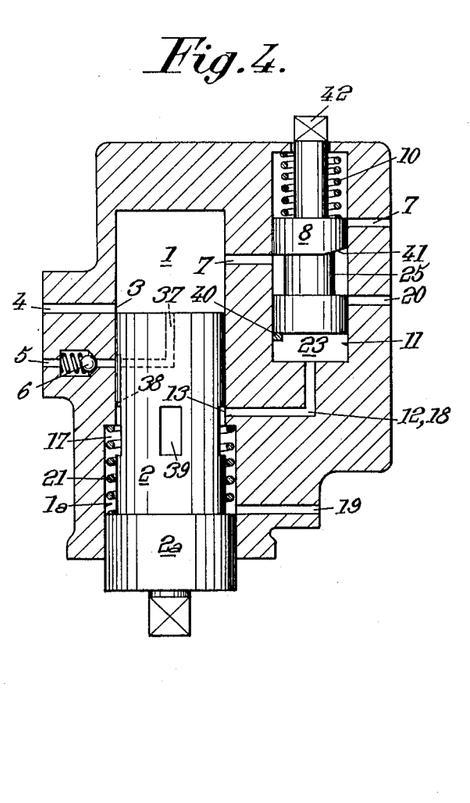

I may also combine conduit 12 and channel 18 into a single passage and provide therein means for periodically forming the throttled passage 13 during only the suction stroke of the auxiliary piston 2a, check valve 24 being then dispensed with. This solution is particularly advantageous in the case of pumps the piston of which is given a movement of rotation about its axis in combination with the reciprocating axial movement, so that said piston can act as a distributing valve. Instead of a single delivery conduit 5 in permanent communication with cylinder 1, I then provide as many conduits 5 as there are cylinders to be fed with fuel, these conduits 5 opening radially into cylinder 1 opposite the wall of piston 2 and being successively brought into communication with cylinder 1 through a passage 37 provided in piston 2 and opening from the lateral wall thereof through a longitudinal port 38 (FIG. 4).

In this case, the single conduit 12—18 opens opposite the side wall of piston 2 at a level where said piston is provided with flat surfaces 39 (forming recesses) the number of which is equal to the number of conduits 5, said flat portions extending into annular space 17.

During the delivery stroke of piston 2, the cross-section of the passage for the flow of the liquid along flat surfaces 39 between annular space 17 and conduit 12, 18 is maximum. During the return stroke of piston 2, on the contrary, due to the rotation of said piston, said cross-section is minimum, thus producing the throttled passage 13.

According to a modification, I may also provide in conduit 12 a valve member actuated in synchronism with the main piston 2—2a for closing said conduit 12 during the delivery stroke of the auxiliary pump.

According to the construction of FIG. 5, this valve member is a slide valve 29, slidable in a cylindrical housing 30 and subjected, against the action of a return spring 31, to the action of the pressure existing in space 17, this pressure being transmitted through a channel 32.

According to the embodiment of FIG. 6, said valve member is constituted by the main piston 2 itself. For this purpose, this piston is provided with a groove 33 and two distinct portions of conduit 12 are made to open into the wall of cylinder 1 at a level such that conduit 12 is opened by groove 33 only when piston 2 is close to its lower dead center position. It has been supposed, by way of example, that conduit 12 passes through a chamber 34 formed in cylindrical housing 11 between shuttle piston 8 and the portion of said cylindrical housing located on the other side of said shuttle piston from chamber 23, conduit 12 then extending so as to lead to a feed chamber 35. In this case, it is advisable to provide a separation between said chamber 35 and chamber 34, by means of a check valve 36.

The pump of FIGS. 3 to 11 works in the following manner.

On the drawings, piston 2—2a is shown in its lower dead center position and shuttle piston 8 in its lowest position for which it closes discharge conduit 7.

During the delivery stroke of the main piston 2—2a (upward stroke on the drawings), this piston first closes port 3 and conduit 19. Piston 2 then delivers through conduit 5 a portion of the fuel contained in cylinder 1. Simultaneously, the extension 2a of piston 2 delivers liquid from annular space 17 into chamber 23, past check valve 24, so that shuttle piston 8 is moved upwardly. When the shuttle piston reaches a given level, it opens, through its groove 25, discharge conduit 7, which stops injection.

During the suction stroke of the main piston 2—2a (downward stroke), shuttle piston 8, which is pushed back by spring 10, is braked due to the fact that it delivers the liquid contained in chamber 23 through conduit 12 and past throttled passage 13 (check valve 24 being then closed). When piston 2—2a reaches its lower dead center position, cylinder 1 is filled with fuel through conduit 4 and the vacuum which may exist in spaces 12, 17, 18, 23 is filled with liquid flowing in through conduit 19.

When the engine fed with fuel by the pump runs at a speed lower than a given speed, shuttle piston 8 has time to reach its lower position shown by the drawings before piston 2—2a starts on its next delivery stroke, and consequently before said shuttle piston is compelled to move back in the upward direction by the thrust of the liquid delivered from annular chamber 17. The stroke of shuttle piston 8 is then given a constant amplitude, discharge conduit 7 is opened at a point of the stroke of piston 2 which is always the same and the amount of fuel injected on every cycle is constant and maximum.

When the engine exceeds said limit speed, shuttle piston 8 can move through only a portion of its maximum downward stroke, which portion decreases more and more as the speed increases. It follows that discharge conduit 7 is opened relatively earlier and earlier during the delivery stroke of piston 2—2a and the amount of fuel injected on every cycle decreases as the speed increases.

When channel 20 is placed sufficiently close to abutment 40, the shuttle piston stops when its clears this channel 20, and therefore always at the same point of its upward stroke. When channel 20 is located in a higher position or when there is no such channel, the shuttle piston stops, during its upward stroke, in a position which depends upon the speed of the engine.

It is advantageous to place channel 20 at a point such that the shuttle piston moves a given distance beyond the position for which it just opens discharge conduit 7. In this way, if the speed of the engine keeps increasing, there comes a time when shuttle piston 8 no longer has time to close conduit 7 and injection stops. The engine cannot exceed a top speed corresponding to such conditions.

Of course, the regulation operation above described is influenced by variations of the cross-section of throttled passage 13.

When the cross-section of said throttled passage is automatically reduced in accordance with increases of the speed (governor 28 on FIGS. 3, 5 and 6), the delivery of the pump decreases more rapidly as a function of the speed, until the above indicated top speed is reached. When the cross-section of throttled passage 13 is adjusted manually (movable member 26 on FIGS. 7, 8 and 11, or 50 on FIGS. 9 and 10), the speed of the engine increases when said cross-section increases, the movable adjustment member being possibly actuated by the throttle control.

According to another feature of my invention, means are provided for varying the stroke of the shuttle piston that is necessary in order to open discharge conduit 7.

Said means may be arranged in such manner that they permit of displacing the abutment 40 which limits the return stroke of the shuttle piston. For instance, as shown by FIG. 7, the abutment consists of the end 40a of a screw 40b adjustably screwed in the pump body. However it seems more advantageous, in order to obtain the desired result, to give the portion of shuttle piston 8 that cooperates with discharge conduit 7 an oblique edge 41 and to provide means for modifying the angular position of the shuttle piston about its longitudinal axis. This oblique edge may limit the annular groove 25, as shown by FIGS. 3 to 6 and 11. In these figures the means in question consist of a portion 42 of square cross-section which may be actuated by the engine throttle control.

According to the angular position given to shuttle piston 8, conduit 7 is opened at a different time during the stroke of piston 2 and the delivery of the pump varies accordingly.

When the delivery of the pump is adjusted by rotation of shuttle piston 8 about its axis, this shuttle piston therefore being provided with an inclined edge such as 41, it may be advantageous to arrange the shuttle piston so that, when it occupies the angular position corresponding to the minimum delivery, it opens a passage of restricted cross-section connecting chamber 23 with discharge conduit 20. As shown by FIG. 11, this passage may be constituted by a groove 53 provided in the periphery of the portion 43 of the shuttle piston.

In this case, member 26 is adjusted in a given position which fixes the maximum speed of operation. The throttle control of the engine is capable of rotating part 42 and of determining an adjustment of the delivery from a minimum value to the nominal value, owing to oblique edge 41. For the angular position corresponding to the minimum delivery, groove 53 connects chamber 23 with conduit 20. This position is used for starting the engine fed with fuel by the pump. When the engine is being started, the liquid fed by the auxiliary pump to chamber 23 escapes directly to the outside through groove 23 and conduit 20. Shuttle piston 8 is not lifted and does not open discharge conduit 7. The whole of the fuel from the main pump cylinder 1 is sent to delivery conduit 5. But as soon as the engine has started, the speed increases. Groove 53 cannot permit the outflow of liquid therethrough at the rate of flow corresponding to this speed. The pressure in chamber 23 causes shuttle piston 8 to operate. A regulation of the idling speed is thus automatically obtained.

According to another feature of my invention, the shuttle piston, during its upward stroke, connects chamber 23 successively with a discharge conduit of small cross-section and a discharge conduit of large cross-section.

More particularly, in the case of FIGS. 7 and 8, there is provided over a portion of the height of the shuttle piston a passage of small cross-section, capable of communicating with discharge conduit 20 and forming therewith the above mentioned discharge conduit of small cross-section, conduit 20 forming in itself the discharge conduit of large cross-section.

For this purpose, as shown by FIG. 7, the portion 43 of shuttle piston 8 which fits in cylindrical casing 11, so as to separate chamber 23 from groove 25, carries a cylindrical extension 44 of slightly smaller diameter, which limits with the wall of cylinder 11 said passage of small cross-section. Alternately, as shown by FIG. 8, shuttle piston 8 may be provided with a portion 45 of the same diameter as portion 43 and limiting therewith a groove 46, portion 45 being provided with a flat surface 47, which limits with the wall of cylinder 11 said passage of small cross-section.

In the construction of FIG. 9, the discharge passage of small cross-section is provided in the pump body.

For this purpose, in a discharge channel 48 opening into cylindrical casing 11 opposite the portion 43 of shuttle piston 8 when said shuttle piston is applied against its abutment 40, I provide a throttled passage 49 by means of the same valve member 50 which limits the throttled passage 13 of the braking means, an inclined surface 50c being provided for this purpose in addition to inclined surface 50a.

At low speeds, the discharge channel of small cross-section, when shuttle piston 8 is just lifted sufficiently to open it, is sufficient to evacuate the whole of the liquid arriving through conduit 18. The upward movement of the shuttle piston is then limited to value $l$ marked on FIGS. 7, 8 and 9. Its maximum return stroke is therefore reduced and the speed of the engine must become higher to cause the shuttle piston to start receiving the jet of liquid delivered through conduit 18 before it has reached its abutment 40. At high speeds, the situation is different and the upward displacement of shuttle piston 8 is increased up to a value L marked on the same figures. Anyway, the shuttle piston is arranged in such manner as to open the discharge conduit 7 of the main cylinder for any upward displacement of the shuttle piston ranging from $l$ to L.

In this manner, the coefficient of irregularity in percentage of the speed is increased at low and intermediate speeds, and in particular idling speeds, without said coefficient being increased at maximum speed, which is favorable for obtaining a good stability of operation of the engine.

Concerning more particularly FIG. 9, for the position of valve member 50 corresponding to the minimum opening of throttled passage 13, therefore at low speeds, the throttled passage 49 is opened to the maximum degree and the above mentioned coefficient is of high value because it is conduit 48 that limits the lifting movement of the shuttle piston. For positions of valve member 50 corresponding to the maximum opening of throttled passage 13, therefore at high speeds of the engine, channel 48 is closed and the above mentioned coefficient has a low value because it is conduit 20 that limits the lifting movement of the shuttle piston. In a general manner, as the respective cross-sections of throttled passages 13 and 49 vary in inverse fashion with respect to each other, the value of the coefficient varies as a function of the speed of the pump.

According to another feature of my invention, the pump being provided with a movable member capable of adjusting the cross-section of throttled passage 13, this member is arranged in such manner that, when it reduces said cross-section to a minimum, it places chamber 23 constantly in communication with the discharge passage.

For this purpose, the rotary member 50 on FIG. 10 may be provided with longitudinal grooves 51 which connects conduit 12 with a discharge passage 52 when member 50 occupies a given angular position. In this way, at very low speeds (starting of the engine), the shuttle piston is not lifted and consequently the main piston delivers a maximum amount of fuel to the injectors.

Advantageously, groove 51 is given a small cross-section so that, when the engine is idling, groove 51 is insufficient to evacuate the liquid coming from conduit 18. The regulating function of the shuttle piston is thus automatically restored.

Figure 12:
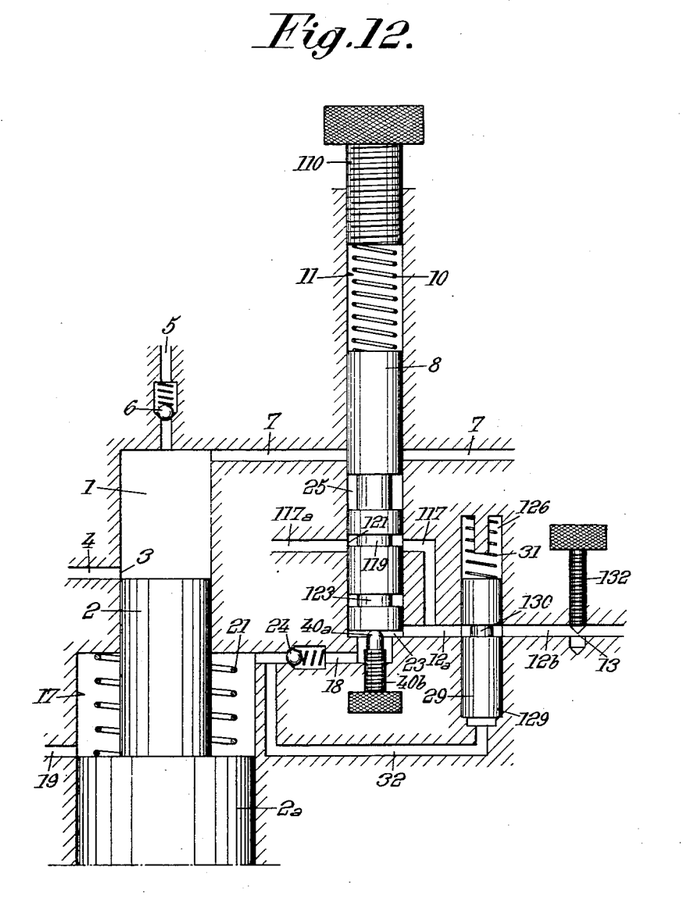
FIGS. 12 and 13 diagrammatically show, in axial section, a fuel injection pump made according to another modification, the parts being shown in two relative different positions in said FIGURES 12 and 13 respectively.
Figure 13:
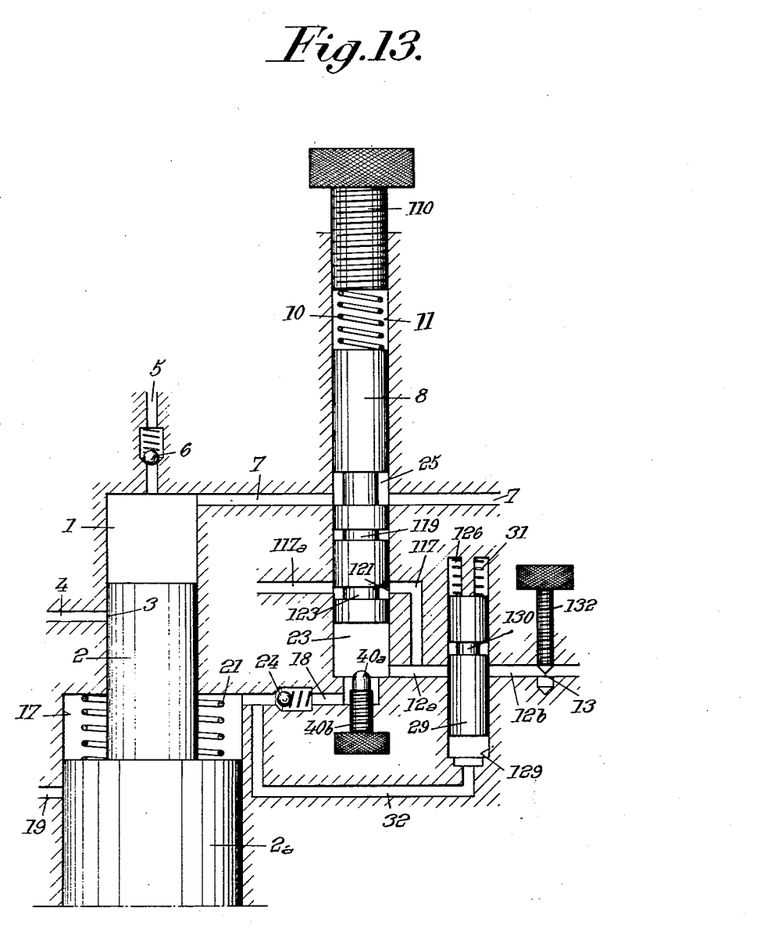

The pump of FIGS. 12 and 13 includes a piston 2 driven in such manner, for instance by means of a cam (not shown), that the movement of the piston is accelerated from the time, at the beginning of its upward stroke, when fuel starts being compressed and delivered. When the upward stroke of piston 2 is obtained by means of a cam, the downward stroke thereof is obtained by means of a return spring 21.

Piston 2 reciprocates in a cylinder 1 into which opens, at 3, a feed conduit 4 through which fuel arrives in the usual manner from an auxiliary pump (not shown). Furthermore, a delivery conduit 5 provided with a check-valve 6 leads out from said cylinder 1. This delivery conduit 5 conveys the fuel delivered by the pump toward the injector or injectors (not shown) of the engine fed by the pump.

A discharge conduit 7 also leads from the top of cylinder 1 to the outside. This discharge conduit 7 is controlled by a shuttle piston 8 acting as a slide valve.

Piston 2, during its upward stroke and after it has closed port 3, delivers fuel into conduit 5 as long as slide valve 8 keeps discharge conduit 7 closed. But fuel delivery through conduit 5 ceases as soon as slide valve 8 opens discharge conduit 7.

In order to control slide valve 8, I apply thereto, on the one hand a downwardly directed force preferably produced by a return spring 10, for instance adjustable by means of a screw 110, and on the other hand the upwardly directed thrust of a liquid receiving pressure impulses at a frequency equal to that of the reciprocating movement of piston 2, this pressure reaching, during the upward strokes of piston 2, peak values which increase, as the speed at which the pump is driven (i.e. the speed of the engine fed by the pump) increases up to a value for which said pressure overcomes the resistance of spring 10. Then, for speeds exceeding this value, the liquid pressure capable of overcoming the resistance of spring 10 is reached for shorter and shorter upward displacements of piston 2.

In order to produce said pulsating pressure of the liquid used to actuate slide valve 8, I make use of an auxiliary reciprocating pump including an auxiliary piston $2a$ fitting slidably in an auxiliary cylinder 17. Cylinder 17 is provided with a feed conduit 19, also preferably connected with the delivery of a primary pump (not shown) which may be the same as that which supplies liquid to conduit 4. A delivery conduit 18, leading from auxiliary cylinder 17 and containing a check-valve 24, is in communication with one of the ends of a cylinder 11 in which slide valve 8 is slidably fitted, the pressure of the liquid in conduit 18 acting against the thrust of return spring 10 on slide valve 8.

According to a particularly simple construction illustrated by the drawing, the main piston 2 and the auxiliary piston $2a$ form a single unit and cylinders 1 and 17 are in line and coaxial with each other. In this case, return spring 21 may be housed in cylinder 17, this spring being common to both of the pistons $2a$ and 2, which are driven by the same cam. Feed conduits 4 and 19 are disposed in such manner as to be simultaneously closed by pistons 2 and $2a$ respectively, so that the compression strokes of said pistons begin simultaneously.

In order to comply with the above stated conditions concerning the pressure of the liquid delivered by piston $2a$, this liquid is caused to pass through a throttled passage controlled by slide valve 8 itself. A conduit 117 branching out from an extension $12a$ of conduit 18 located downstream of cylinder 11, opens into the wall of cylinder 11 opposite a discharge conduit $117a$ in line with conduit 117. Slide valve 8 is provided with a groove 119 located at a level such that, when slide valve 8 is in its position of rest (where the bottom end of said slide valve is applied against an abutment $40a$ as shown by FIG. 12), the lower edge of groove 119 and the opening of conduit 117 into cylinder 11 limit between them a throttled passage 121 through which the liquid delivered by piston $2a$ must flow to pass into discharge conduit $117a$.

The initial value of the cross-section of this throttled passage depends upon the position of abutment 40a, which position is preferably adjustable by means of a screw 40b.

It will be seen that as soon as the pressure of the liquid delivered by piston 2a reaches a value sufficient to overcome the thrust of return spring 10, the area of the cross-section of throttled passage 121 decreases, and quickly becomes equal to zero. If, at this time, piston 2a has not yet reached the end of its upward stroke, slide valve 8 is suddenly pushed upwardly until a second groove 123, provided in slide valve 8 below groove 119, comes opposite conduits 117 and 117a and thus enables the liquid still delivered by piston 2a to flow to the outside. This movement of slide valve 8 simultaneously brings opposite discharge conduit 7 a third groove 25 provided in slide valve 8 above groove 119, whereby conduit 7 places cylinder 1 in communication with the outside.

In order to give the variations of the cross-section area of throttled passage 121 a law different from the linear law obtained with groove 119, I may replace this groove 119 by a passage extending throughout the slide valve and having a suitable cross-section, for instance a circular, triangular or other cross-section, which, in cooperation with the cross-section (also of suitable shape) of the opening of conduit 117 into cylinder 11, permits of obtaining the desired law of variation.

In order to obtain the return of slide valve 8 to its position of rest immediately after the beginning of every downward stroke of piston 2a and 2, an outflow conduit 12a—12b is opened during every downward stroke of piston 2a so as to by-pass throttled passage 121, this conduit 12a—12b being of course closed during every upward (delivery) stroke of piston 2.

In order to control this outflow conduit 12a–12b, I advantageously make use of a slide valve 29 actuated in synchronism with the reciprocating movement of piston 2a by means of the pressure of the liquid present in cylinder 17. For this purpose, one of the ends of cylinder 126, in which slide valve 29 is movable, is connected through a conduit 32 to cylinder 17, or to conduit 18. In this last case, which is that illustrated by the drawings, the point of conduit 18 from which conduit 32 branches off is located upstream of check-valve 24. A return spring 31 interposed between the upper end of cylinder 126 and slide valve 29 urges said slide valve toward its position of rest where it is applied against a shoulder 129 at the lower end of cylinder 126. In this position of rest, slide valve 29 opens, through its groove 130, the communication between the portions 12a and 12b of the outflow conduit. Thus, slide valve 29 is in its position of rest during every downward stroke of piston 2a and it is moved away from this position, thus closing outflow conduit 12a—12b, during every upward stroke of piston 2a.

In the embodiment of my invention shown by the drawings, conduits 4 and 19 open into the respective cylinders 1 and 17 at points such that, during every upward stroke of pistons 2 and 2a, piston 2a closes conduit 19 and starts compressing liquid and delivering it from cylinder 17 at the same time as piston 2 closes conduit 4 and delivers liquid from cylinder 1 toward delivery conduit 5.

Outflow conduit portion 12b is throttled at 13 and the cross-section of this throttled passage 13 is advantageously adjustable by means of a screw 132 the end of which projects more or less into conduit 12b to form said throttled passage.

Groove 25 in slide valve 8 is of a height much greater than that of discharge conduit 7. Furthermore groove 123 is positioned in slide valve 8 so as to open discharge conduit 117—117a and thus to stop the upward movement of slide valve 8 when said slide valve has moved a substantial distance beyond the position for which its groove 25 starts opening discharge conduit 7.

FIG. 12 shows the parts in the position they occupy when pistons 2 and 2a are approximately in their lower dead center position.

This pump works as follows.

Since pistons 2a and 2 are supposed to undergo an acceleration, during every upward stroke thereof, even when the engine on which the pump is mounted runs at a constant speed, the pressure of the liquid which, during every upward stroke of piston 2a, flows through the throttled passage 121, rises during said stroke up to a value which, as long as slide valve 8 is not lifted, i.e. for relatively low values of the speed of the engine on which the pump is mounted, increases when said speed increases. For a given value of the engine speed, this liquid pressure, which acts upon the lower end face of slide valve 8, becomes sufficiently high to overcome the resistance of spring 10 and slide valve 8 starts moving upwardly. This movement further reduces the cross-section area of throttled passage 121 which, in turn, increases the liquid pressure acting on the lower end face of valve 8 and further accelerates the reduction of the cross-section area of throttle passage 121. Full closing of throttled passage 121 and upward displacement of slide valve 8 to the position where it opens discharge conduit 7 are therefore practically instantaneous. Slide valve 8 then remains in its upper position (FIG. 13) until the end of the upward stroke of piston 2a groove 123 opening the communication between conduits 117, 117a by an amount just sufficient to keep it in this position.

For higher and higher speeds of the engine above the above mentioned value, this opening of discharge conduit 7 takes place for shorter and shorter initial portions of the strokes of piston 2a. As long as the opening of discharge conduit 7 takes place after inlet conduit 4 has been closed by piston 2, some amount of fuel is delivered by piston 2 through delivery conduit 5 toward the injector or injectors to be fed by the pump but this amount decreases as the speed of the engine (i.e. the frequency of reciprocation of pistons 2 and 2a) increases.

Furthermore, during the return (downward) movements of slide valve 8 (which then discharges the liquid present in chamber 23 through conduit 12a—12b, slide valve 29 having been pushed into lower position by spring 31), the flow of liquid is slowed down by the throttling of conduit portion 12b at 13, thus braking said downward movements of slide valve 8. For a given throttling at 13 and a given adjustment of spring 10, the time taken by slide valve to move down from its upper position (shown by FIG. 13) to a bottom position in which groove 119 opens passage 121 between 117 and 117a is always the same, irrespective of the speed at which the pump is driven. Therefore, as this speed increases, it reaches a value such that piston 2a begins its compression (upward) stroke before slide valve 8 has had time to reach this bottom position. The liquid pressure then supplied by piston 2a quickly returns slide valve 8 into the position where discharge conduit 7 is fully opened. Injection is then reduced. If the engine speed has reached a value such that piston 2a starts on its upward stroke before slide valve 8 has begun to shut off discharge conduit 7, said discharge conduit remains constantly open. There is no longer any injection and a limit speed has been reached.

Concerning the adjustment of the cross-section area of throttled passage 13, it might be placed under control of a governor, in particular a speed governor such as a centrifugal governor.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the persent invention as comprehended within the scope of the accompanying claims.

The present invention is a continuation in part of my prior patent applications Ser. No. 780,452 filed December 15, 1958, for Self-Regulating Pumps in Particular for the Injection of Fuel Into Internal Combustion Engines and Ser. No. 811,176, filed May 5, 1959 for Self-Regulating Pumps, in Particular for the Injection of Fuel Into Internal Combustion Engines.

What I claim is:

1. A self-regulating liquid pump which comprises, in combination, a main cylinder, a main piston fitting slidably in said cylinder, means for reciprocating said piston in said cylinder, a delivery conduit in communication with one end of said cylinder, means forming a housing having at least one cylindrical portion, a first discharge conduit element leading from said cylinder to a first point of said housing located in said cylindrical portion thereof, a second discharge conduit element leading from a second point located in said cylindrical part of said housing to the outside, a reciprocating shuttle piston having a cylindrical portion thereof fitting slidably in said housing cylindrical portions so as to form therein a slide valve controlling the communication between said two discharge conduit elements through the inside of said housing, said shuttle piston limiting, together with said housing, a variable volume chamber so that variation of the volume of said chamber corresponds to a movement of said shuttle piston in said housing, said second point of said housing being out of communication with said variable volume chamber, an auxiliary reciprocating pump operatively connected with said main piston so as to work in synchronism therewith, conduit means for connecting the delivery of said auxiliary pump with said variable volume chamber so as to move said shuttle piston in said housing in one direction in response to every delivery stroke of said auxiliary pump, the above mentioned points of said housing being so located as to be placed in communication with each other through said housing by said shuttle piston moving in said direction, on every reciprocation thereof, means, operative at least during the return strokes of the main piston, for exerting a limited thrust on said shuttle piston in the opposed direction, and hydraulic dash-pot means in communication with said housing for braking the displacements of said shuttle piston in said second mentioned direction.

2. A pump according to claim 1 in which said housing comprises a second internal cylindrical portion in line with the first one and of a greater diameter, said shuttle piston comprising another cylindrical portion in line with said cylindrical portion thereof and of a greater diameter and adapted to fit slidably in said second cylindrical portion of said housing, said variable volume chamber consisting of the annular space existing between the wall of said second cylindrical portion of said housing and said first cylindrical portion of said shuttle piston, said hydraulic dash-pot means being in communication with said first cylindrical portion of said housing.

3. A pump according to claim 1 wherein said means for exerting a limited thrust on said shuttle in said opposed direction consists of a spring operatively connected with said shuttle piston.

4. A pump according to claim 1 wherein said hydraulic dash-pot means are adjustable.

5. A pump according to claim 1 wherein said housing is provided with a discharge passage positioned to place said variable volume chamber in communication with the outside when said shuttle piston has been moved a distance in the first mentioned direction at least sufficient to place said two above mentioned points in communication with each other.

6. A self-regulating liquid pump which comprises, in combination, a main cylinder, a main piston fitting slidably in said cylinder, means for reciprocating said piston in said cylinder, a delivery conduit in communication with one end of said cylinder, means forming a housing having an internal cylindrical wall, a first discharge conduit element leading from said cylinder to a first point of said housing, a second discharge conduit element leading from a second point of said housing to the outside, at least one of said two points being located in said housing cylindrical wall, a reciprocating shuttle piston having a cylindrical portion thereof fitting slidably in said housing so as to form therein a slide valve controlling the communication between said two discharge conduit elements through the inside of said housing, said shuttle piston limiting, together with said housing, a variable volume chamber so that variation of the volume of said chamber corresponds to a movement of said shuttle piston in said housing, said two points of said housing being both out of communication with said variable volume chamber, an auxiliary reciprocating pump operatively connected with said main piston so as to work in synchronism therewith, conduit means for connecting the delivery of said auxiliary pump with said variable volume chamber so as to move said shuttle piston in said housing in one direction in response to every delivery stroke of said auxiliary pump, the above mentioned points of said housing being so located as to be placed in communication with each other through said housing by said shuttle piston moving in said direction, one every reciprocation thereof, means operative at least during the return strokes of the main piston for exerting a limited thrust on said shuttle piston in the opposed direction, and hydraulic dash-pot means in communication with said variable volume chamber for braking the displacements of said shuttle piston in said second mentioned direction.

7. A pump according to claim 6 in which said conduit means constitutes the only communciation between the auxiliary pump and the variable volume chamber, said auxiliary pump having a piston both reciprocable longitudinally and rotatable angularly in its body, said last mentioned piston being a plunger piston the cylindrical wall of which is provided with a recess adapted to cooperate with the opening of said conduit means into the cylindrical inner wall of said body, said auxiliary pump piston being rotated during its longitudinal displacements so as to cause said recess to clear the communication between the auxiliary pump and the variable volume chamber during every delivery stroke of said plunger piston and to throttle said communication during every return stroke of said auxiliary pump piston, thus braking said shuttle piston during said return stroke.

8. A pump according to claim 6 further comprising abutment means in said housing for fixing the position of said shuttle piston at the end of its maximum displacements in the second mentioned direction and adjusting means for varying the length of the displacement of the shuttle piston in the first mentioned direction that is necessary to move said piston from said position into the position where it places said two points of said housing in communication with each other, said last mentioned means including an oblique edge carried by said shuttle valve piston to cooperate with one of said points and means for rotating said shuttle piston about its axis in its housing so as to cause the desired portion of said edge to cooperate with said point.

9. A pump according to claim 6 further comprising adjustable abutment means in said housing for fixing the position of said shuttle piston at the end of its displacements in the second mentioned direction.

10. A pump according to claim 6 in which both of said discharge conduit elements open into said cylindrical wall of said housing at points located at different levels respectively.

11. A pump according to claim 6 wherein said conduit means constitutes the only communication between the auxiliary pump and the variable volume chamber, said hydraulic dash-pot means comprising means operatively connected with said main piston for throttling said conduit means during every time interval between two consecutive delivery strokes of said main piston, and for clearing said conduit means during the delivery strokes of said main piston.

12. A pump according to claim 6 further comprising abutment means in said housing for fixing the position of said shuttle piston at the end of its maximum displacements in the second mentioned direction and adjusting means for varying the length of the displacement of the shuttle piston in the first mentioned direction that is necessary to move said piston from said position into the position where it places said two points of said housing in communication with each other.

13. A self-regulating liquid pump which comprises, in combination, a main cylinder, a main piston fitting slidably in said cylinder, means for reciprocating said piston in said cylinder, a delivery conduit in communication with one end of said cylinder, means forming a housing having an internal cylindrical wall, a first discharge conduit element leading from said cylinder to a first point of said housing, a second discharge conduit element leading from a second point of said housing to the outside, at least one of said two points being located in said housing cylindrical wall, a reciprocating shuttle piston having a cylindrical portion thereof fitting slidably in said housing so as to form therein a slide valve controlling the communication between said two discharge conduit elements through the inside of said housing, said shuttle piston limiting, together with said housing, a variable volume chamber so that variation of the volume of said chamber corresponds to a movement of said shuttle piston in said housing said two points of said housing being both out of communication with said variable volume chamber, an auxiliary reciprocating pump operatively connected with said main piston so as to work in synchronism therewith, conduit means for connecting the delivery of said auxiliary pump with said variable volume chamber so as to move said shuttle piston in said housing in one direction in response to every delivery stroke of said auxiliary pump, the above mentioned points of said housing being so located as to be placed in communication with each other through said housing by said shuttle piston moving in said direction, on every reciprocation thereof, valve means in said last mentioned conduit means for preventing the flow of liquid therethrough from said variable volume chamber toward said auxiliary pump during the time intervals between the delivery strokes of said auxiliary pump, means operative at least during the return strokes of the main piston for exerting a limited thrust on said shuttle piston in the opposed direction, an outflow conduit starting from said variable volume chamber, and a throttled passage in said outflow conduit to brake the displacements of said shuttle piston in said second mentioned direction.

14. A pump according to claim 13, further comprising means for rotating said shuttle piston about its axis in said housing and a discharge conduit starting from the variable volume chamber and leading to the outside, said shuttle piston being provided with a passage for connecting said variable volume chamber with said last mentioned discharge conduit when said shuttle piston is angularly set in its housing in a predetermined position.

15. A pump according to claim 13 in which said means for adjusting the cross-section of the throttled passage are arranged to connect said variable volume chamber with the outside permanently when said cross-section is given a minimum value by said adjusting means.

16. A pump according to claim 13 wherein the cylindrical wall of said housing is provided with a discharge passage positioned to place said variable volume chamber in communication with the outside when said shuttle piston has been moved a distance in the first mentioned direction at least sufficient to place said two above mentioned points in communication with each other.

17. A pump according to claim 13 wherein said means for exerting a limited thrust on said shuttle in said opposed direction consists of a spring operatively connected with said shuttle piston.

18. A pump according to claim 13 wherein said throttled passage is of adjustable cross-section area.

19. A pump according to claim 13 wherein said outflow conduit forms a communication between said variable volume chamber and said auxiliary pump.

20. A self-regulating liquid pump which comprises, in combination, a main cylinder, a main piston fitting slidably in said cylinder, means for reciprocating said piston in said cylinder, a delivery conduit in communication with one end of said cylinder, means forming a housing having an internal cylindrical wall, a first discharge conduit element leading from said cylinder to a first point of said housing, a second discharge conduit element leading from a second point of said housing to the outside, at least one of said two points being located in said housing cylindrical wall, a reciprocating shuttle piston having a cylindrical portion thereof fitting slidably in said housing so as to form therein a slide valve controlling the communication between said two discharge conduit elements through the inside of said housing, said shuttle piston limiting, together with said housing, a variable volume chamber so that variation of the volume of said chamber corresponds to a movement of said shuttle piston in said housing, said two points of said housing being both out of communication with said variable volume chamber, an auxiliary reciprocating pump operatively connected with said main piston so as to work in synchronism therewith, conduit means for connecting the delivery of said auxiliary pump with said variable volume chamber so as to move said shuttle piston in said housing in one direction in response to every delivery stroke of said auxiliary pump, the above mentioned points of said housing being so located as to be placed in communication with each other through said housing by said shuttle piston moving in said direction, on every reciprocation thereof, valve means in said last mentioned conduit means for preventing the flow of liquid therethrough from said variable volume chamber toward said auxiliary pump during the time intervals between the delivery strokes of said auxiliary pump, means, operative at least during the return strokes of the main piston, for exerting a limited thrust on said shuttle piston in the opposed direction, an outflow conduit starting from said variable volume chamber, a throttled passage in said outflow conduit to brake the displacements of said shuttle piston in said second mentioned direction, and means for preventing liquid from flowing out from said variable volume chamber through said outflow conduit during at least a portion of every delivery stroke of the auxiliary pump.

21. A pump according to claim 20 in which said last mentioned means consist of a slide valve mounted across said outflow conduit and hydraulic means interposed between said auxiliary pump and said last mentioned slide valve for closing it during at least a portion of every delivery stroke of said auxiliary pump.

22. A pump according to claim 20 in which said last mentioned means consist of the main piston acting as a slide valve mounted across said outflow conduit.

23. A self-regulating liquid pump which comprises, in combination, a main cylinder, a main piston fitting slidably in said cylinder, means for reciprocating said piston in said cylinder, a delivery conduit in communication with one end of said cylinder, means forming a housing having a cylindrical wall, a first discharge conduit element leading from said cylinder end to a first point of said housing, a second discharge conduit element leading from a second point of said housing to the outside, at least one of said two points being located in said housing cylindrical wall, a reciprocating shuttle piston having a cylindrical portion thereof fitting slidably in said housing so as to form therein a slide valve controlling the communication between said two discharge conduit elements through the inside of said housing, said shuttle piston limiting, together with said housing, a variable volume chamber so that variation of the volume of said chamber corresponds to a movement of said shuttle piston in said housing, said two points of said housing both out of communication with said variable volume chamber, an auxiliary reciprocating pump operatively connected with said main piston so as to work in synchronism therewith, conduit means for connecting the delivery of said auxiliary pump with said variable volume chamber so as to move said shuttle piston in said housing in one direction in response to every delivery stroke of said auxiliary pump, the above mentioned points of said housing being so located as to be placed in communication with each other through said housing by said shuttle piston moving in said direction, on every reciprocation thereof, valve means in said last mentioned conduit means for preventing the flow of liquid therethrough from said variable volume chamber toward said auxiliary pump during the time intervals between the delivery strokes of said auxiliary pump, means, operative at least during the return strokes of the main piston, for exerting a limited thrust on said shuttle piston in the opposed direction, an outflow conduit starting from said variable volume chamber, a throttled passage in said outflow conduit to brake the displacements of said shuttle piston in said second mentioned direction, and means forming two discharge passages leading out from two different points of said cylindrical wall of said housing and starting from said variable volume chamber and opening to the outside, the first of said last mentioned discharge passages having a small cross-section and the second a large cross-section, the first discharge passage being arranged to be opened for a small displacement of said shuttle piston in the first direction and the second discharge passage by a greater displacement of said shuttle piston in this direction.

24. A pump according to claim 23 in which said means forming said two discharge passages comprise a discharge conduit extending through the wall of said housing and an extension carried by said shuttle piston for reducing the rate of flow of liquid through said last mentioned discharge conduit for a small displacement of said shuttle piston in said first direction and clearing said last mentioned discharge conduit for a greater displacement of said shuttle piston in said direction.

25. A pump according to claim 23 in which the means forming said two discharge passages comprise two discharge conduits extending through the wall of said housing and means for throttling that of said two last mentioned discharge conduits which is first cleared by said throttle piston moving in said first direction.

26. A pump according to claim 23 in which the means forming said two discharge passages comprise two discharge conduits extending through the wall of said housing, means for throttling that of said two last mentioned discharge conduits which is first cleared by said throttle piston moving in said first direction and means for simultaneously adjusting both said last mentioned throttling means and the cross section area of said throttled passage in the outflow conduit, said adjusting means being arranged to open more and more said throttling means when the cross section area of said throttled passage is being reduced and to close more and more said throttling means when the cross section area of said throttled passage is being increased.

27. A self-regulating liquid pump which comprises, in combination, a main cylinder, a main piston fitting slidably in said cylinder, means for reciprocating said main piston in said cylinder, a delivery conduit in communication with one end of said cylinder, means forming a housing having at least one cylindrical portion, a first discharge conduit element leading from said cylinder to a point of said cylindrical portion of said housing, a second discharge conduit element leading from another point of said cylindrical portion of said housing to the outside, a reciprocating shuttle piston having a cylindrical portion thereof fitting slidably in said cylindrical portion of said housing so as to form therein a slide valve controlling the communication between said two discharge conduit elements through the inside of said housing, said shuttle piston defining, together with said housing a variable volume chamber so that variation of the volume of said chamber corresponds to a movement of said shuttle piston in said housing, an auxiliary reciprocating pump operatively connected with said main piston so as to work in synchronism therewith, conduit means for connecting the delivery of said auxiliary pump with said variable volume chamber so as to move said shuttle piston in said housing in one direction in response to every delivery stroke of said auxiliary pump, the above mentioned points of said housing being so located as to be placed in communication with each other through said housing by said shuttle piston moving in said direction, on every reciprocation thereof, valve means in said last mentioned conduit means for preventing the flow of liquid therethrough from said variable volume chamber toward said auxiliary pump delivery, resilient means for urging said shuttle piston in the opposed direction, an outflow conduit connected to said variable volume chamber, means forming a throttled passage in said outflow conduit to brake the displacements of said shuttle piston in said second mentioned direction, and means operatively connected with said main piston reciprocating means for varying the cross section of said throttled passage in accordance with variations of the speed at which said main piston is reciprocated.

28. A self-regulating liquid pump which comprises, in combination, a main cylinder, a main piston fitting slidably in said cylinder, means for reciprocating said piston in said cylinder, a delivery conduit in communication with one end of said cylinder, means forming a housing having at least one cylindrical portion, a first discharge conduit element leading from said cylinder to a point of said cylindrical portion of said housing, a second discharge conduit element leading from another point of said cylindrical portion of said housing to the outside, a reciprocating shuttle piston having a cylindrical portion thereof fitting slidably in said cylindrical portion of said housing so as to form therein a slide valve controlling the communication between said two discharge conduit elements through the inside of said housing, said shuttle piston defining, together with said housing a variable volume chamber so that variation of the volume of said chamber corresponds to a movement of said shuttle piston in said housing, an auxiliary reciprocating pump operatively connected with said main piston so as to work in synchronism therewith, conduit means for connecting the delivery of said auxiliary pump with said variable volume chamber so as to move said shuttle piston in said housing in one direction in response to every delivery stroke of said auxiliary pump, the above mentioned points of said housing being so located as to be placed in communication with each other through said housing by said shuttle piston moving in said direction, on every reciprocation thereof, valve means in said last mentioned conduit means for preventing the flow of liquid therethrough from said variable volume chamber toward said auxiliary pump delivery, resilient means for urging said shuttle piston in the opposed direction, an outflow conduit connected to said variable volume chamber, a throttle valve in said outflow conduit to brake the displacements of said shuttle piston in said second mentioned direction, and a centrifugal governor driven at a speed proportional to the mean speed of said main piston for controlling said throttle valve so as to close it the more as said speed increases.

References Cited in the file of this patent

UNITED STATES PATENTS

| 3,027,843 | Raibaud | Apr. 3, 1962 |

FOREIGN PATENTS

| 1,139,068 | France | Feb. 4, 1957 |
| 1,150,997 | France | Aug. 19, 1957 |
| 1,185,828 | France | Feb. 16, 1959 |
| 1,195,424 | France | May 19, 1959 |